United States Patent [19]
Sproat

[11] Patent Number: 5,806,032
[45] Date of Patent: Sep. 8, 1998

[54] COMPILATION OF WEIGHTED FINITE-STATE TRANSDUCERS FROM DECISION TREES

[75] Inventor: Richard William Sproat, Berkeley Heights, N.J.

[73] Assignee: Lucent Technologies Inc., Murray Hill, N.J.

[21] Appl. No.: 663,767

[22] Filed: Jun. 14, 1996

[51] Int. Cl.[6] ..................................................... G10L 9/00
[52] U.S. Cl. .............................. 704/255; 704/257; 704/9
[58] Field of Search .................................. 395/2.64, 2.54, 395/2.66, 2.69, 2.44; 704/235, 245, 255, 257, 260, 9

[56] References Cited

PUBLICATIONS

M.D. Riley, "Some Applications of Tree–based Modelling To Speech And Language," *Proceedings of the Speech and Natural Language Workshop*, Cape Cod, MA, Oct. 1989, pp. 339–352.

M. D. Riley, "A Statistical Model For Generating Pronunciation Networks," *Proceedings of the International Conference on Acoustics, Speech, and Signal Processing*, ICASSP91, Oct. 1991, pp. S11.1–S11.4.

A. Ljolje et al., "Optimal Speech Recognition Using Phone Recognition and Lexical Access," *Proceedings of ICSLP*, Banff, Canada, Oct. 1992, pp. 313–316.

J. Oncina et al., "Learning Subsequential Transducers For Pattern Recognition Interpretation Tasks," *IEEE Transactions on Pattern Analysis and Machine Intelligence*, vol. 15, May 1993, pp. 448–458.

F. Pereira et al., "Weighted Rational Transductions and Their Application to Human Language Processing," *ARPA Workshop on Human Language Technology*, Mar. 1994, pp. 240–254.

R. Sproat, "A Finite–State Architecture for Tokenization and Grapheme–to–Phoneme Conversion in Multilingual Text Analysis," *Proceedings of the EACL SIGDAT Workshop*, Dublin, Ireland, Mar. 1995, pp. 65–72.

R. M. Kaplan et al., Regular Models of Phonological Rule Systems, *Computational Linguistics*, vol. 20, Sep. 1994, pp. 331–378.

D. Gildea et al., "Automatic Induction of Finite State Transducers for Simple Phonological Rules," *33rd Annual Meeting of the Associates for Computational Linguistics*, Morristown, NJ, 1995, pp. 9–15, (Jun. 1995).

D.M. Magerman, "Statistical Decision–Tree Models For Parsing," *33rd Annual Meeting of the Association for Computational Linguistics*, Morristown, NJ, Apr. 1995, pp. 276–283.

F. Pereira et al., "Speech Recognition by Composition of Weighted Finite Automata," *CMP–LG* archive paper 9603001, Mar. 1996, pp. 1–24.

*Primary Examiner*—David R. Hudspeth
*Assistant Examiner*—Susan Wieland
*Attorney, Agent, or Firm*—Kenneth M. Brown

[57] ABSTRACT

A method for automatically converting a decision tree into one or more weighted finite-state transducers. Specifically, the method in accordance with an illustrative embodiment of the present invention processes one or more terminal (i.e., leaf) nodes of a given decision tree to generate one or more corresponding weighted rewrite rules. Then, these weighted rewrite rules are processed to generate weighted finite-state transducers corresponding to the one or more terminal nodes of the decision tree. In this manner, decision trees may be advantageously compiled into weighted finite-state transducers, and these transducers may then be used directly in various speech and natural language processing systems. The weighted rewrite rules employed herein comprise an extension of conventional rewrite rules, familiar to those skilled in the art.

30 Claims, 2 Drawing Sheets

COMPILATION OF WEIGHTED FINITE-STATE TRANSDUCERS FROM DECISION TREES

FIELD OF THE INVENTION

The present invention relates generally to the field of linguistic modeling as used, for example, in speech recognition and/or speech synthesis systems, and more particularly to finite-state methods for implementing such linguistic models in such systems.

BACKGROUND OF THE INVENTION

Much attention has been devoted recently to methods for inferring linguistic models from linguistic data. One powerful inference method that has been used in various applications are decision trees, and in particular classification and regression trees ("CART"), well known to those of ordinary skill in the art. As is also well known to those skilled in the art, these decision trees can be "grown" from linguistic data by the application of conventional methods, such as are described, for example, in Michael D. Riley, "Some Applications of Tree-based Modelling to Speech and Language," Proceedings of the Speech and Natural Language Workshop, pages 339–352, Cape Cod, Mass., October 1989. Other applications of tree-based modeling to specific problems in speech and natural language processing are discussed, for example, in Michael D. Riley, "A Statistical Model for Generating Pronunciation Networks," Proceedings of the International Conference on Acoustics, Speech and Signal Processing, pages S11.1–S11.4, October, 1991, and in David M. Magerman, "Statistical Decision-Tree Models for Parsing," 33rd Annual Meeting of the Association for Computational Linguistics, pages 276–283, Morristown, N.J. April, 1995. Each of these references is incorporated by reference as if fully set forth herein.

An increasing amount of attention has also been focused on finite-state methods for implementing linguistic models. These methods include, in particular, the use of finite-state transducers and weighted finite-state transducers. See, e.g., Ronald M. Kaplan and Martin Kay, "Regular Models of Phonological Rule Systems," Computational Linguistics, 20:331–378, September, 1994, and Fernando Pereira, Michael Riley and Richard Sproat, "Weighted Rational Transductions and their Application to Human Language Processing," ARPA Workshop on Human Language Technology, pages 249–254, March, 1994. Each of these references is also incorporated by reference as if fully set forth herein.

One reason for the interest in the use of finite-state mechanisms is that finite-state machines provide a mathematically well-understood computational framework for representing a wide variety of information, both in natural language processing and in speech processing. Lexicons, phonological rules, Hidden Markov Models, and regular grammars, each of which is well known to those of ordinary skill in the art, are all representable as finite-state machines. Moreover, the availability of finite-state operations such as union, intersection and composition means that information from these various sources can be combined in useful and computationally attractive ways. The above-cited papers (among others) provide further justification for the use of finite-state methods for implementing linguistic models.

Despite the recent attention given to both the use of decision trees for inferring linguistic models from linguistic data, and the use of finite-state methods for implementing linguistic models, there have not heretofore been any viable techniques whereby these two strands of research have been combined in such a manner as to leverage the advantages of each. In particular, whereas generating decision trees from linguistic data has proven quite successful, and whereas finite-state based system implementations have been successfully developed, no techniques for automatically deriving finite-state models from decision trees have been developed, and only partial success has been achieved in attempts to directly infer transducers from linguistic data. (See, e.g., Daniel Gildea and Daniel Jurafsky, "Automatic Induction of Finite State Transducers for Simple Phonological Rules," 33rd Annual Meeting of the Association for Computational Linguistics, pages 9–15, Morristown, N.J. June, 1995, also incorporated by reference as if fully set forth herein.) Thus, if these two techniques could be "married" in the form of an automated procedure for converting the information in decision trees into weighted finite-state transducers, information inferred from linguistic data and represented in a decision tree could be used directly in a system that represents other information, such as lexicons or grammars, in the form of finite-state machines.

SUMMARY OF THE INVENTION

The use of decision trees for linguistic modelling and the use of finite-state transducers are advantageously combined by a method in accordance with an illustrative embodiment of the present invention, whereby a decision tree is automatically converted into one or more weighted finite-state transducers. Specifically, the illustrative method processes one or more terminal (i.e., leaf) nodes of a given decision tree to generate one or more corresponding weighted rewrite rules. Then, these weighted rewrite rules are processed to generate weighted finite-state transducers corresponding to the one or more terminal nodes of the decision tree. In this manner, decision trees may be advantageously compiled into weighted finite-state transducers, and these transducers may then be used directly in various speech and natural language processing systems. The weighted rewrite rules employed herein comprise an extension of conventional rewrite rules, familiar to those skilled in the art.

DETAILED DESCRIPTION

Tree-based modelling

Figure 1:
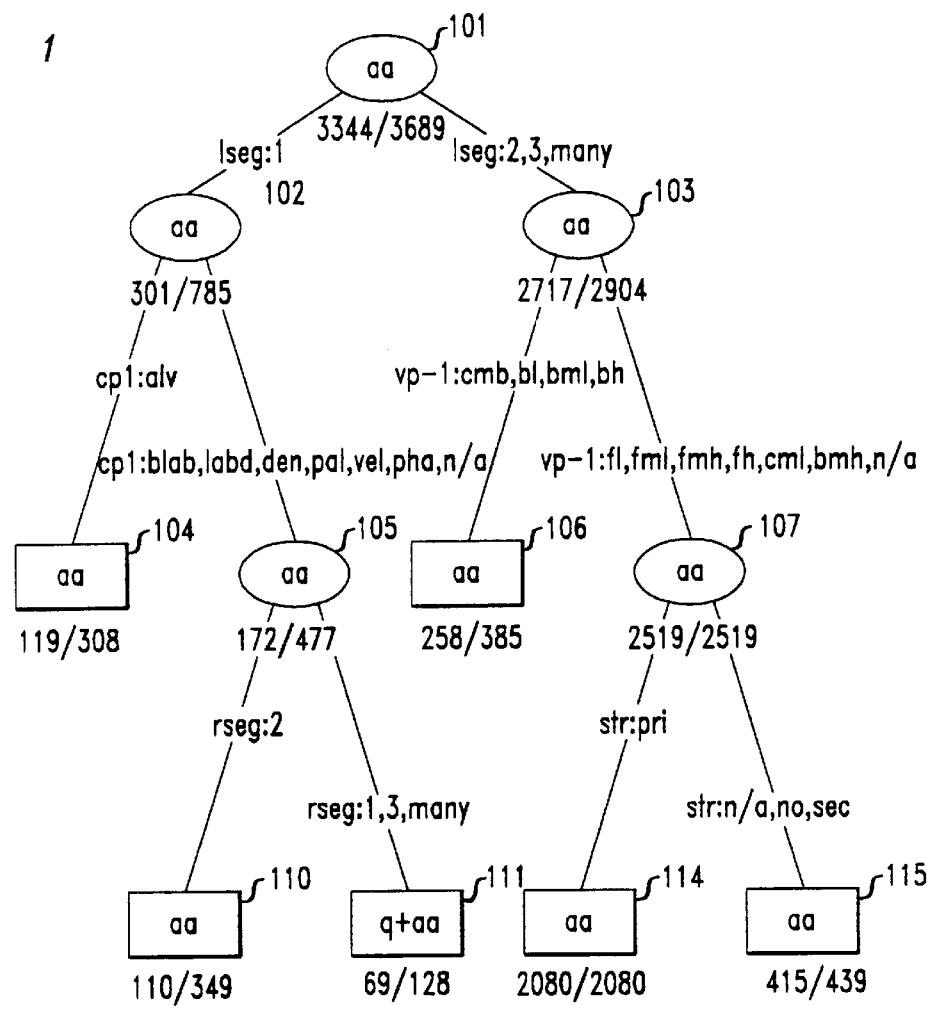
FIG. 1 shows an illustrative decision tree which may be provided as input to a procedure for generating weighted finite-state transducers from decision trees, such as the illustrative procedure of FIG. 3.
Figure 3:
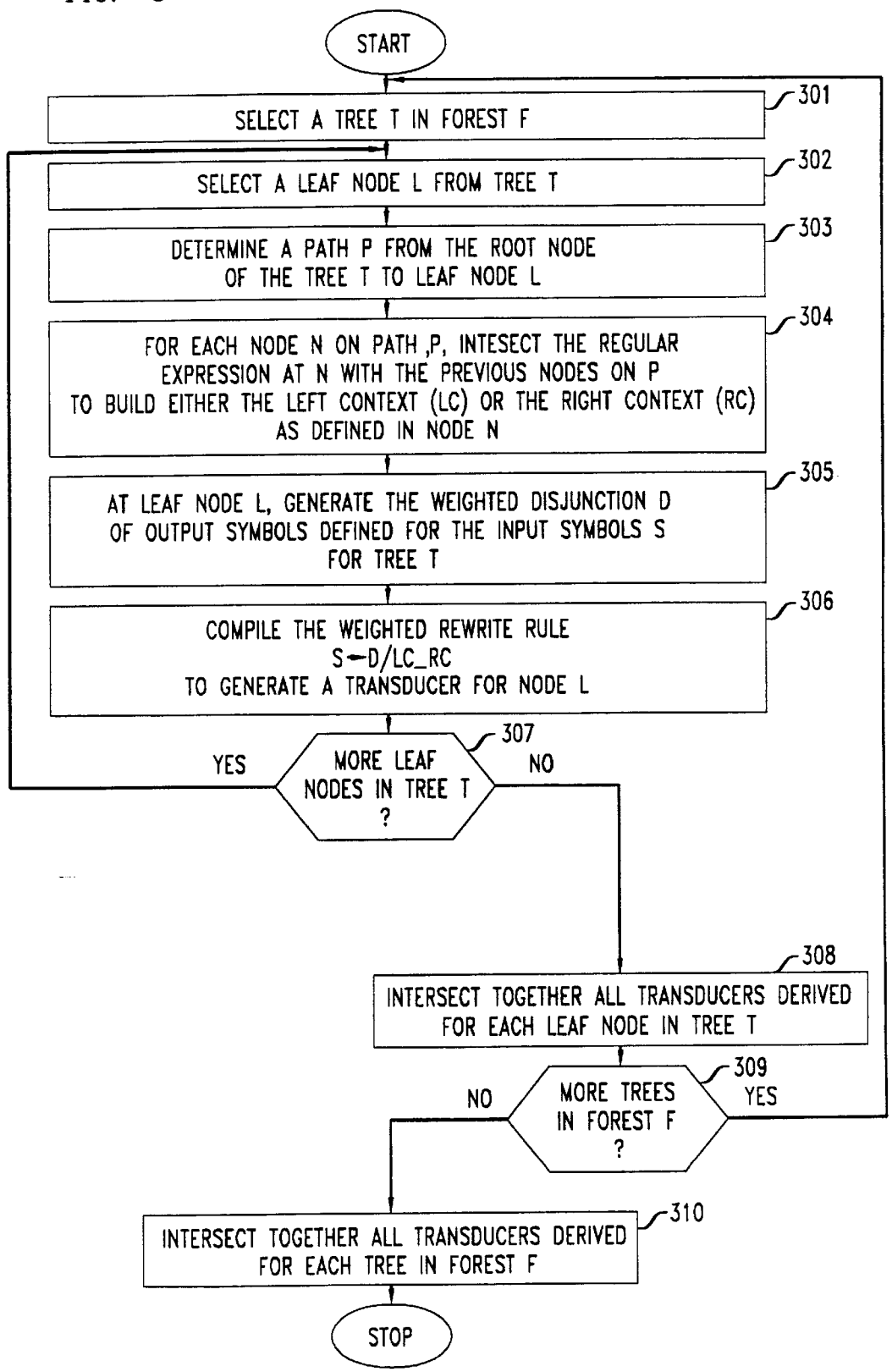
FIG. 3 shows a flow diagram of an illustrative procedure for generating weighted finite-state transducers from decision trees in accordance with an illustrative embodiment of the present invention.

FIG. 1 shows an illustrative decision tree which may be provided as input to a procedure for generating weighted finite-state transducers from decision trees, such as the illustrative procedure of FIG. 3. All of the phones in the figure are given in "ARPABET," familiar to those of ordinary skill in the art. The tree of FIG. 1 was trained, in particular, on the "TIMIT" database, also familiar to those skilled in the art, and models the phonetic realization of the English phoneme /aa/ in various environments. (See, e.g., "A Statistical Model for Generating Pronunciation Networks," cited above.) When the tree of FIG. 1 is used for predicting the allophonic form of a particular instance of /aa/, one starts at the root of the tree (i.e., node 101), and asks questions about the environment in which the /aa/ phoneme is found, traversing a path "down" the tree, dependent on the answers to the questions. In particular, each non-leaf node (e.g., nodes 101, 102, 103, 105 and 107), dominates two daughter nodes. As one traverses a path down the tree, the decision on whether to go left or right depends on the answer to the question being asked at the given node. The following table provides an explanation of the symbols used to label the arcs of the decision tree of FIG. 1:

cpn place of articulation of consonant n segments to the right cp-n place of articulation of consonant n segments to the left values: alveolar; bilabial; labiodental; dental; palatal; velar; pharyngeal; n/a if is a vowel, or there is no such segment.

vpn place of articulation of vowel n segments to the right vp-n place of articulation of vowel n segments to the left values: central-mid-high; back-low; back-mid-low; back-high; front-low; front-mid-low; front-mid-high; front-high; central-mid-low; back-mid-high; n/a if is a consonant, or there is no such segment.

lseg number of preceding segments including the segment of interest within the word rseg number of following segments including the segment of interest within the word values: 1, 2, 3, many str stress assigned to this vowel values: primary, secondary, no (zero) stress n/a if there is no stress mark By way of illustration, consider, for example, that the phoneme /aa/ exists in some particular environment. The first question that is asked (at the root node—node 101) concerns the number of segments, including the /aa/ phoneme itself, that occur to the left of the /aa/ in the word in which /aa/ occurs. In this case, if the /aa/ is initial—i.e., lseg is 1, one goes left to node 102; if there is one or more segments to the left in the word, one goes right to node 103. Let us assume for illustrative purposes that this /aa/ is initial in the word, in which case we go left to node 102. The next question (asked at node 102) concerns the consonantal "place" of articulation of the segment to the right of /aa/—if it is alveolar go left to node 104; otherwise, if it is of some other quality, or if the segment to the right of /aa/ is not a consonant, then go right to node 105. Let us now assume that the segment to the right is, for example, /z/, which is alveolar. Thus, we go left to terminal (i.e., leaf) node 104. The indication of "119/308" at node 104 indicates that in the training data, 119 out of 308 occurrences of the /aa/ phoneme in this particular environment were realized as the phone [ao]. In other words, we can estimate the probability of /aa/ being realized as [ao] in this environment as 0.385, or, equivalently, we can assign a "weight" (equal to the negative of the logarithm of the probability) of 0.95 thereto. The full set of realizations at node 104 with estimated non-zero probabilities is, in fact, as follows:

| phone | probability | weight = −log prob. |
|---|---|---|
| ao | 0.385 | 0.95 |
| aa | 0.289 | 1.24 |
| q + aa | 0.103 | 2.27 |
| q + ao | 0.096 | 2.34 |
| ah | 0.069 | 2.68 |
| ax | 0.058 | 2.84 |

Note that a decision tree in general is a complete description, in the sense that for any new data point, there will be some leaf node that corresponds to it. Thus, for the tree in FIG. 1, each new instance of the phoneme /aa/ will be handled by (exactly) one leaf node in the tree, depending upon the environment in which the /aa/ is found. Also note that each decision tree considered herein has the property that its predictions specify how to rewrite a symbol (in context) in an input string. In particular, they specify a two-level mapping from a set of input symbols (phonemes) to a set of output symbols (allophones).

Rewrite rule compilation

It is well known to those skilled in the art (and, in particular, finite-state phonology), that systems of rewrite rules of the familiar form $\phi \rightarrow \psi / \lambda\_\rho$, where $\phi$, $\psi$, $\lambda$ and $\rho$ are regular expressions, can be represented computationally as finite-state transducers (FSTs), and that these rewrite rules can be automatically converted to such corresponding FSTs. (Note that $\phi$ represents the input to the rewrite rule, $\psi$ represents the output of the rewrite rule, and $\lambda$ and $\rho$ represent the left and right contexts, respectively.) See, e.g., "Regular Models of Phonological Rule Systems," cited above, which presents one particular procedure (hereinafter the Kaplan and Kay, or "KK" procedure) for compiling systems of such rewrite rules into FSTs. In accordance with an illustrative embodiment of the present invention, such a procedure can be advantageously extended to include the compilation of probabilistic or weighted rules into weighted finite-state-transducers (WFSTs). As is well known to those skilled in the art, weighted finite-state transducers are defined as transducers such that, in addition to having standard input and output labels, each transition is further labeled with a weight. (See, e.g., "Weighted Rational Transductions and their Application to Human Language Processing," cited above.)

Instead of the "KK" procedure, familiar to those skilled in the art, an improved procedure for compiling rewrite rules into finite-state transducers may be advantageously employed in accordance with one illustrative embodiment of the present invention. Specifically, in contrast to the "KK" algorithm which introduces context labelled brackets widely, only to restrict their occurrence subsequently (see "Regular Models of Phonological Rule Systems," cited above), the improved procedure introduces context symbols just when and where they are needed. Furthermore, the number of intermediate transducers necessary in the construction of the rules is smaller than in the "KK" procedure, and each of the transducers can be constructed more directly and efficiently from the primitive expressions of the rule, $\phi$, $\psi$, $\lambda$ and $\rho$.

For example, in accordance with the illustrative improved procedure for compiling rewrite rules into finite-state transducers, a transducer which corresponds to the left-to-right obligatory rule $\phi \rightarrow \psi / \lambda\_\rho$ can be obtained by the composition of five transducers:

$$r \circ f \circ \text{replace} \circ l_1 \circ l_2$$

Specifically, these five transducers operate as follows:

1. The transducer r introduces in a string a marker ">" before every instance of $\rho$. This transformation may be written as follows: $\Sigma^* \rho \rightarrow \Sigma^* > \rho$.
2. The transducers $f$ introduces markers "$<_1$" and "$<_2$" before each instance of $\phi$ that is followed by a ">" marker: $(\Sigma \cup \{>\})^* \phi > \rightarrow (\Sigma \cup \{>\})^* \{<_1, <_2\} \phi >$. In other words, this transducer marks just those $\phi$ that occur before $\rho$.
3. The replacement transducer replace replaces $\phi$ with $\psi$ in the context $<_1 \phi >$, simultaneously deleting the ">" marker in all positions. Since ">", "$<_1$", and "$<_2$" need to be ignored when determining an occurrence of $\phi$, there are loops over the transitions $>:\epsilon$, $<_1:\epsilon$, $<_2:\epsilon$ at all states of $\phi$, or equivalently of the states of the cross product transducer $\phi \times \psi$.

4. The transducer $l_1$ admits only those strings in which occurrences of a "$<_1$" marker are preceded by $\lambda$ and deletes the "$<_1$" at such occurrences: $\Sigma^*\lambda<_1 \to \Sigma^*\lambda$.

5. The transducer $l_2$ admits only those strings in which occurrences of a "$<_2$" marker are not preceded by $\lambda$ and deletes the "$<_2$" at such occurrences: $\Sigma^*\bar{\lambda}<_2 \to \Sigma^*\bar{\lambda}$.

Illustrative extended rewrite rule compilation procedure

In accordance with an illustrative embodiment of the present invention, a rewrite rule to finite-state transducer compilation procedure which has been extended to handle weighted rules is employed. With such an extended procedure, we can allow $\psi$ in the rule $\phi \to \psi/\lambda\_\rho$ to represent a weighted regular expression. That is, the transducer corresponding to such a weighted rewrite rule (e.g., the transducer generated by the illustrative extended rule compilation procedure described herein) will replace $\phi$ with $\psi$ having the appropriate weights in the context $\lambda\_\rho$.

Specifically, rewrite rules can be advantageously generalized by letting $\psi$ be a rational power series, familiar to those skilled in the art (and, in particular, formal language theory). The result of the application of a generalized rule to a string is then a set of weighted strings which can be represented by a weighted automaton. The rational power series considered herein are functions which map $\Sigma^*$ to $\Re_+ \cup \{\infty\}$, which can be described by regular expressions over the alphabet $(\Re_+ \cup \{\infty\})x\Sigma$. For example, $S=(4a)(2b)^*(3b)$ is a rational power series. It defines a function in the following way—it associates a non-null number only with the strings recognized by the regular expression ab*b. This number may be obtained by adding the coefficients involved in the recognition of the string. For example, the value which may be associated with abbb is (S,abbb)=4+2+2+3=11.

In general, such extended regular expressions can be redundant. Some strings can be matched in different ways with distinct coefficients. The value associated with those strings may then be the minimum of all possible results. $S'=(2a)(3b)+(4b)+(5a)(3b^*)$ matches abb, for example, with the different weights 2+3+4=9 and 5+3+3=11. The minimum of the two is the value advantageously associated with abb—that is, (S',abb)=9. Non-negative numbers in the definition of these power series are often interpreted as the negative logarithm of probabilities. This explains the above choice of the operations—addition of the weights along the string recognition, and minimization, since we are interested in the result which has the highest probability. Note that based on the terminology of the theory of languages, familiar to those skilled in the art, the functions we consider here are power series defined on the tropical semiring $(\Re_+ \cup \{\infty\}, \min, +, \infty, 0)$.

By way of example, consider the following rule, which states that an abstract nasal, denoted N, is obligatorily rewritten as m in the context of a following labial:

N→m/_[+labial].

Now suppose that this is only probabilistically true, and that while ninety percent of the time N does indeed become m in this environment, about ten percent of the time in real speech it becomes n instead. Converting from probabilities to weights, one would say that N becomes m with weight $\alpha=-\log(0.9)$, and n with weight $\beta=-\log(0.1)$, in the given environment. One could represent this by the following weighted obligatory rule:

N→αm+βn/_[+labial].

The result of the application of a weighted transducer to a string, or more generally to an automaton, is a weighted automaton. The corresponding operation is similar to that in the unweighted case. However, the weight of the transducer and those of the string or automaton need to be combined too, here added, during composition. The composition operation has been generalized to the weighted case by introducing this combination of weights. The procedure described above can then be advantageously used to compile weighted rewrite rules into weighted finite-state transducers.

Figure 2:
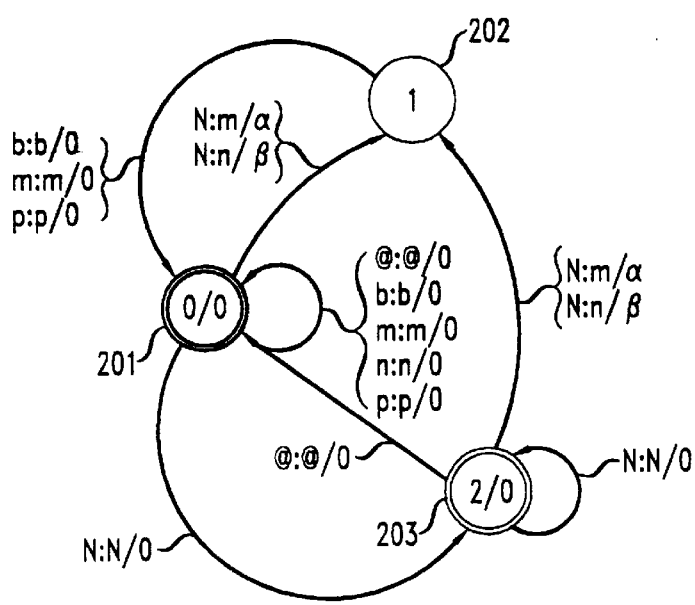
FIG. 2 shows an illustrative weighted finite-state transducer generated, for example, by the illustrative procedure of FIG. 3.

FIG. 2 shows an illustrative weighted finite-state transducer which may, for example, have been generated by the illustrative extended rewrite rule procedure described above (and which may, therefore, have been generated by a decision tree compilation procedure in accordance with the illustrative embodiment of the present invention described below). FIG. 2 shows, in particular, a weighted transducer representing the weighted obligatory rule shown above (i.e., N→αm+βn/_[+labial]). As used in the figure, the symbol "@" denotes all letters different from b, m, n, p and N.

An illustrative decision tree to WFST compilation procedure

Two assumptions on the nature of a given decision tree advantageously enables efficient compilation into a WFST in accordance with an illustrative embodiment of the present invention. First, we advantageously assume that the predictions at the leaf nodes specify how to rewrite a particular symbol in an input string. And, second, we advantageously presume that the decisions at each node are stateable as regular expressions over the input string. In accordance with the illustrative tree compilation procedure, each leaf node will be considered to represent a single weighted rewrite rule.

Specifically, the regular expressions for each branch describe one aspect of the left context $\lambda$, the right context $\rho$, or both. The left and right contexts for the rule consist of the intersections of the partial descriptions of these contexts defined for each branch traversed between the root and the given leaf node. The input $\phi$ is predefined for the entire tree, whereas the output $\psi$ is defined as the union of the set of outputs, along with their weights, that are associated with the given leaf node. The weighted rule belonging to the leaf node can then be compiled into a transducer using the illustrative weighted rule compilation procedure described above. Then, the transducer for the entire tree can be derived by the intersection of the entire set of transducers generated from the individual leaf nodes. Note that while regular relations are not generally closed under intersection, the subset of same-length (or more strictly speaking length-preserving) relations is, in fact, closed.

By way of an illustrative example, refer to the sample decision tree shown in FIG. 1. Since this tree models the phonetic realization of /aa/, we can immediately set $\phi$ to be aa for the whole tree. Next, consider again the traversal of the tree from root node 101 to leaf node 104, as described above. The first decision concerns the number of segments to the left of the /aa/ in the word, either none for the left branch, or one or more for the right branch. Assuming that a symbol, $\alpha$, represents a single segment, a symbol, #, represents a word boundary, and allowing for the possibility of intervening optional stress marks (') which do not count as segments, these two possibilities can be represented by the following regular expressions for $\lambda$:

For the left branch, $\lambda=\#Opt(')$, and for the right branch, $$\lambda=(\#Opt(')\alpha Opt('))\cup(\#Opt(')\alpha Opt(')\alpha Opt('))\cup(\#Opt(')\alpha Opt(')\alpha Opt(')(\alpha Opt('))^+)=(\#Opt(')\alpha)^+Opt(').$$

(Note that the notation used herein is essentially that of Kaplan and Kay, familiar to those skilled in the art, and defined in "Regular Models of Phonological Rule Systems," cited above. Note also that, as per convention, superscript "+" denotes one or more instances of an expression.)

At this node there is no decision based on the righthand context, so the righthand context is free. We can represent this by setting ρ at this node to be $\Sigma^*$, where $\Sigma$ (conventionally) represents the entire alphabet. (Note that the alphabet is defined to be an alphabet of all correspondence pairs that were determined empirically to be possible.)

Next, the decision at the left daughter of the root node (i.e., node 102) concerns whether or not the segment to the right is an alveolar. Assuming we have defined classes of segments alv, blab, and so forth (represented as unions of segments) we can represent the regular expression for ρ as follows:

For the left branch, ρ=Opt(')(alv), and for the right branch, $$\rho = (Opt(')(blab)) \cup (Opt(')(labd)) \cup (Opt(')(den)) \cup (Opt(')(pal)) \cup (Opt(')(vel)) \cup (Opt(')(pha)) \cup (Opt(')(n/a)).$$

In this case, λ is unrestricted, so we can set λ at this node to be $\Sigma^*$.

We can then derive the λ and ρ expressions for the rule at leaf node 104 by intersecting together the expressions for these contexts defined for each branch traversed on the way to the leaf. In particular, for leaf node 104, $\lambda = \#Opt(') \cap \Sigma^* = \#Opt(')$, and $\rho = \Sigma^* \cap Opt(')(alv) = Opt(')(alv)$. (Strictly speaking, since the λs and ρs at each branch may define expressions of different lengths, it is advantageous to left-pad each λ with $\Sigma^*$, and to right-pad each ρ with $\Sigma^*$.) The rule input φ has already been given as aa. The output ψ is defined as the union of all of the possible expressions (at the leaf node in question) that aa could become, with their associated weights (e.g., negative log probabilities), which are represented here as subscripted floating-point numbers:

$$\psi = ao_{0.95} \cup aa_{1.24} \cup q + aa_{2.27} \cup q + ao_{2.34} \cup ah_{2.68} \cup ax_{2.84}$$

Thus, the entire weighted rule for leaf node 104 may be written as:

$$aa \rightarrow (ao_{0.95} \cup aa_{1.24} \cup q + aa_{2.27} \cup q + ao_{2.34} \cup ah_{2.68} \cup ax_{2.84}) / \#Opt(')\_Opt(')(alv)$$

And by a similar construction, the rule for node 106, for example, may be written as:

$$aa \rightarrow (aa_{0.40} \cup ao_{1.11}) / (\#(Opt(')\alpha)^+ Opt(')) \cap (\Sigma^* ((cmh) \cup (bl) \cup (bml) \cup (bh)))\_\Sigma^*$$

In this manner, each node may be advantageously used to generate a rule which states that a mapping occurs between the input symbol φ and the weighted expression ψ in the condition described by λ_ρ. In cases where φ finds itself in a context that is not subsumed by λ_ρ, the rule behaves exactly as a two-level surface coercion rule, familiar to those of ordinary skill in the art—it freely allows φ to correspond to any ψ as specified by the alphabet of pairs. These φ:ψ correspondences may, however, be constrained by other rules derived from the tree, as described below.

The interpretation of the full tree is that it represents the conjunction of all such mappings. That is, for rules 1, 2 . . . n, φ corresponds to $\psi_1$ given condition $\lambda_1\_\rho_1$ and φ corresponds to $\psi_2$ given condition $\lambda_2\_\rho_2$ . . . and φ corresponds to $\psi_m$ given condition $\lambda_n\_\rho_n$. But this conjunction is simply the intersection of the entire set of transducers defined for the leaves of the tree. Observe now that the φ:ψ correspondences that were left free by the rule of one leaf node, may be constrained by intersection with the other leaf nodes. Since, as noted above, the tree is a complete description, it follows that for any leaf node i, and for any context λ_ρ not subsumed by $\lambda_i\_\rho_i$, there is some leaf node j such that $\lambda_j\_\rho_j$ subsumes λ_ρ. Thus, the transducers compiled for the rules at nodes 104 and 106, for example, are intersected together, along with the rules for all the other leaf nodes.

As noted above, and as known to those skilled in the art, regular relations—the algebraic counterpart of FSTs—are not in general closed under intersection. However, the subset of same-length regular relations is closed under intersection, since they can be thought of as finite-state acceptors expressed over pairs of symbols. Note, therefore, that one can define intersection for transducers analogously with intersection for acceptors—given two machines $G_1$ and $G_2$, with transition functions $\delta_1$ and $\delta_2$, one can define the transition function of G, δ, as follows: for an input-output pair (i,o), $\delta((q_1,q_2),(i,o))=(q_1,q_2)$ if and only if $\delta_1(q_1,(i,o))=q_1$ and $\delta_2(q_2,(i,o))=q_2$. This point can be extended somewhat to include relations that involve bounded deletions or insertions. This is precisely the interpretation necessary for systems of two-level rules, where a single transducer expressing the entire system may be constructed via intersection of the transducers expressing the individual rules. Indeed, the decision tree represents neither more nor less than a set of weighted two-level rules. Each of the symbols in the expressions for λ and ρ actually represent (sets of) pairs of symbols. Thus, alv, for example, represents all lexical alveolars paired with all of their possible surface realizations. And just as each tree represents a system of weighted two-level rules, so a set of trees—for example, a set in which each tree deals with the realization of a particular phone—represents a system of weighted two-level rules, where each two-level rule is compiled from each of the individual trees.

The above description of the illustrative tree compilation procedure may be summarized in more formal terms as follows. Define a function Compile, which, when given a weighted rewrite rule as input, returns a WFST computing that rule as its output. This function may, for example, comprise the illustrative extended rewrite rule compilation procedure as described above. Alternatively, this function may comprise the "KK" procedure, well known to those skilled in the art, also extended as described above so as to generate a WFST from a weighted rewrite rule. In any event, the WFST for a single leaf L is thus defined as follows, where $\phi_T$ is the input symbol for the entire tree, $\psi_L$ is the output expression defined at L, $P_L$ represents the path traversed from the root node to L, p is an individual branch on that path, and $\lambda_p$ and $\rho_p$ are the expressions for λ and ρ defined at p:

$$\text{Rule}_L = \text{Compile}\left(\phi_T \rightarrow \psi_L / \bigcap_{p \in P_L} \lambda_p \_ \bigcap_{p \in P_L} \rho_p\right)$$

The transducer for an entire tree T is defined as:

$$\text{Rule}_T = \bigcap_{L \in T} \text{Rule}_L$$

And, finally, the transducer for a forest F of trees is:

$$\text{Rule}_F = \bigcap_{T \in F} \text{Rule}_T$$

FIG. 3 shows a flow diagram of the above-described illustrative procedure for generating one or more weighted finite-state transducers from one or more decision trees in accordance with an illustrative embodiment of the present invention. The input provided to the procedure comprises:

1. a forest F of one or more decision trees T;
2. a regular-expression characterization defining a property of either the left context, LC or the right context, RC, or both, of each decision at each node N of each tree T in F;
3. a notation of the input symbol S being transduced by each tree T in F; and
4. the alphabet of all possible input/output symbol pairs allowed by all trees T in F.

The output produced by the procedure comprises one or more transducers representing the forest F of trees.

Specifically, for each tree T in the forest F (selected in step 301), and for each leaf node L in the given tree T (selected in step 302), a weighted finite-state transducer is generated based on the leaf node L (steps 303–306). In particular, the path P from the root node of tree T to the selected leaf node L is determined in step 303. Then, in step 304, for each node N on path P, the regular expression at node N is intersected with the previous nodes on the path to build either the left context (LC) or the right context (RC) as defined for the given node (N). When the leaf node (L) is reached, the illustrative procedure of FIG. 3 generates the weighted disjunction D of output symbols defined for the input symbol S for tree T (step 305). And finally, step 306 compiles the weighted rewrite rule S→D/LC__RC to generate a transducer corresponding to leaf node L. The operation of step 306 may, for example, be implemented with use of one of the illustrative weighted rewrite rule compilation procedures described above. (For example, either the "KK" procedure, extended to handle the compilation of weighted rewrite rules, or the extended improved procedure, as described above, may illustratively be used to implement step 306 of the illustrative procedure of FIG. 3.)

After the transducer corresponding to a given leaf node has been generated, the illustrative procedure of FIG. 3 determines in decision box 307 whether a transducer has been generated for every leaf node in tree T. If not (i.e., if there are more leaf nodes in tree T to process), flow returns to step 302 to select another leaf node from which a transducer will be generated. When transducers have been generated for all leaf nodes in tree T, step 308 intersects together all of the transducers so generated, resulting in a single transducer for tree T as a whole. In other illustrative embodiments of the present invention, step 308 may be avoided, thereby resulting in a plurality of transducers (i.e., one for each leaf node) for tree T, rather than a single combined automaton.

After the generation of the transducer(s) for the given tree is complete, decision box 309 determines whether transducers have been generated for every tree in forest F. If not (i.e., if there are more trees in forest F to process), flow returns to step 301 to select another tree from which one or more transducers will be generated. When transducers have been generated for all trees in forest F, step 310 intersects together all of the transducers so generated, resulting in a single transducer for forest F as a whole. Note that in other illustrative embodiments of the present invention, step 310 also may be avoided, thereby resulting in a plurality of transducers (i.e., one or more for each tree) for forest F, rather than a single combined automaton.

Although a number of specific embodiments of this invention have been shown and described herein, it is to be understood that these embodiments are merely illustrative of the many possible specific arrangements which can be devised in application of the principles of the invention. Numerous and varied other arrangements can be devised in accordance with these principles by those of ordinary skill in the art without departing from the spirit and scope of the invention.

I claim:

1. An automated method for synthesizing speech sounds based on a finite-state representation of linguistic data generated based on one or more decision tree models of said linguistic data, each of the one or more decision tree models comprising one or more terminal nodes thereof, the method comprising the steps of:

generating one or more weighted rewrite rules based on one or more of the terminal nodes of the one or more decision tree models;

generating one or more weighted finite-state transducers based on one or more of the one or more weighted rewrite rules; and synthesizing one or more of said speech sounds based on said one or more weighted finite-state transducers.

2. The method of claim 1 wherein the decision tree models comprise classification and regression trees.

3. The method of claim 2 wherein the decision tree models represent a phonetic realization of one or more phonemes by specifying a mapping of the phonemes into one or more allophones.

4. The method of claim 3 wherein one or more of the decision trees has been trained based on a linguistic database.

5. The method of claim 1 wherein the weighted rewrite rules comprise rules having a form $\phi \rightarrow \psi/\lambda\_\rho$, where $\phi$, $\lambda$, and $\rho$ represent regular expressions, $\psi$ represents a weighted regular expression, and where the form $\phi \rightarrow \psi/\lambda\_\rho$ represents that an occurrence of $\phi$ in an input string is to be replaced by $\psi$ whenever the occurrence of $\phi$ is preceded by $\lambda$ and succeeded by $\rho$.

6. The method of claim 5 wherein the weighted regular expression represented by $\psi$ comprises a rational power series.

7. The method of claim 5 wherein the step of generating the weighted finite-state transducers comprises generating a weighted finite-state transducer for a corresponding weighted rewrite rule having the form $\phi \rightarrow \psi/\lambda\_\rho$ by generating a composition of a first transducer, a second transducer, a third transducer, a fourth transducer and a fifth transducer, wherein:

the first transducer introduces a marker ">" before every occurrence of $\rho$;

the second transducer introduces markers "$<_1$" and "$<_2$" before each occurrence of $\phi$ that is followed by a ">" marker;

the third transducer replaces $\phi$ with $\psi$ when $\phi$ is preceded by a "$<_1$" marker and succeeded by a ">" marker, and deletes each of the ">" markers;

the fourth transducer admits only those input strings in which occurrences of a "$<_1$" marker are preceded by $\lambda$, and deletes the "$<_1$" marker at each such occurrence; and the fifth transducer admits only those input strings in which occurrences of a "$<_2$" marker are not preceded by $\lambda$, and deletes the "$<_2$" marker at each such occurrence.

8. The method of claim 1 wherein a given one of the decision tree models represents an input symbol, S, the given decision tree model further comprising a root node and a plurality of branches labelled with corresponding regular expressions, and wherein the step of generating the weighted rewrite rules comprises:

selecting one of the terminal nodes of the given decision tree model;

determining a path from the root node of the given decision tree model to the selected terminal node thereof, the path comprising one or more of the branches of the given decision tree model;

intersecting one or more of the regular expressions which label the branches of the given decision tree model comprised in the determined path, generating a left context, LC, and a right context, RC, therefrom;

generating a weighted disjunction, D, of output symbols based on the selected terminal node; and generating a weighted rewrite rule having a form S→D/LC__RC, representing that an occurrence of the input symbol, S, in an input string is to be replaced by the weighted disjunction, D, whenever the occurrence of S is preceded by the left context, LC, and succeeded by the right context, RC.

9. The method of claim 1 wherein a given one of the decision tree models comprises a plurality of terminal nodes, wherein the step of generating the weighted rewrite rules comprises generating a plurality of weighted rewrite rules corresponding to the plurality of terminal nodes of the given decision tree model, and wherein the step of generating the weighted finite-state transducers comprises:

generating a plurality of weighted finite-state transducers corresponding to the plurality of generated weighted rewrite rules; and intersecting the plurality of weighted finite-state transducers to produce a weighted finite-state transducer corresponding to the given decision tree model.

10. The method of claim 9 wherein the step of generating the weighted finite-state transducers further comprises intersecting the weighted finite-state transducer corresponding to the given decision tree model with one or more other weighted finite-state transducers corresponding to one or more other decision tree models to produce a weighted finite-state transducer corresponding to a plurality of decision tree models.

11. An apparatus for automatically generating a finite-state representation of linguistic data based on one or more decision tree models of said linguistic data, each of the one or more decision tree models comprising one or more terminal nodes thereof, the apparatus comprising:

means for generating one or more weighted rewrite rules based on one or more of the terminal nodes of the one or more decision tree models; and means for generating one or more weighted finite-state transducers based on one or more of the one or more weighted rewrite rules.

12. The apparatus of claim 11 wherein the decision tree models comprise classification and regression trees.

13. The apparatus of claim 12 wherein the decision tree models represent a phonetic realization of one or more phonemes by specifying a mapping of the phonemes into one or more allophones.

14. The apparatus of claim 13 wherein one or more of the decision trees has been trained based on a linguistic database.

15. The apparatus of claim 11 wherein the weighted rewrite rules comprise rules having a form $\phi \rightarrow \psi / \lambda\_\rho$, where $\phi$, $\lambda$, and $\rho$ represent regular expressions, $\psi$ represents a weighted regular expression, and where the form $\phi \rightarrow \psi / \lambda\_\rho$ represents that an occurrence of $\phi$ in an input string is to be replaced by $\psi$ whenever the occurrence of $\phi$ is preceded by $\lambda$ and succeeded by $\rho$.

16. The apparatus of claim 15 wherein the weighted regular expression represented by $\psi$ comprises a rational power series.

17. The apparatus of claim 15 wherein the means for generating the weighted finite-state transducers comprises means for generating a weighted finite-state transducer for a corresponding weighted rewrite rule having the form $\phi \rightarrow \psi / \lambda\_\rho$ by generating a composition of a first transducer, a second transducer, a third transducer, a fourth transducer and a fifth transducer, wherein:

the first transducer introduces a marker ">" before every occurrence of $\rho$;

the second transducer introduces markers "$<_1$" and "$<_2$" before each occurrence of $\phi$ that is followed by a ">" marker;

the third transducer replaces $\phi$ with $\psi$ when $\phi$ is preceded by a "$<_1$" marker and succeeded by a ">" marker, and deletes each of the ">" markers;

the fourth transducer admits only those input strings in which occurrences of a "$<_1$" marker are preceded by $\lambda$, and deletes the "$<_1$" marker at each such occurrence; and the fifth transducer admits only those input strings in which occurrences of a "$<_2$" marker are not preceded by $\lambda$, and deletes the "$<_2$" marker at each such occurrence.

18. The apparatus of claim 11 wherein a given one of the decision tree models represents an input symbol, S, the given decision tree model further comprising a root node and a plurality of branches labelled with corresponding regular expressions, and wherein the means for generating the weighted rewrite rules comprises:

means for selecting one of the terminal nodes of the given decision tree model;

means for determining a path from the root node of the given decision tree model to the selected terminal node thereof, the path comprising one or more of the branches of the given decision tree model;

means for intersecting one or more of the regular expressions which label the branches of the given decision tree model comprised in the determined path, generating a left context, LC, and a right context, RC, therefrom;

means for generating a weighted disjunction, D, of output symbols based on the selected terminal node; and means for generating a weighted rewrite rule having a form S→D/LC__RC, representing that an occurrence of the input symbol, S, in an input string is to be replaced by the weighted disjunction, D, whenever the occurrence of S is preceded by the left context, LC, and succeeded by the right context, RC.

19. The apparatus of claim 11 wherein a given one of the decision tree models comprises a plurality of terminal nodes, wherein the means for generating the weighted rewrite rules comprises means for generating a plurality of weighted rewrite rules corresponding to the plurality of terminal nodes of the given decision tree model, and wherein the means for generating the weighted finite-state transducers comprises:

means for generating a plurality of weighted finite-state transducers corresponding to the plurality of generated weighted rewrite rules; and means for intersecting the plurality of weighted finite-state transducers to produce a weighted finite-state transducer corresponding to the given decision tree model.

20. The apparatus of claim 19 wherein the means for generating the weighted finite-state transducers further comprises means for intersecting the weighted finite-state transducer corresponding to the given decision tree model with one or more other weighted finite-state transducers corresponding to one or more other decision tree models to produce a weighted finite-state transducer corresponding to a plurality of decision tree models.

21. An automated method for recognizing speech sounds based on a finite-state representation of linguistic data generated based on one or more decision tree models of said linguistic data, each of the one or more decision tree models comprising one or more terminal nodes thereof, the method comprising the steps of:

generating one or more weighted rewrite rules based on one or more of the terminal nodes of the one or more decision tree models;

generating one or more weighted finite-state transducers based on one or more of the one or more weighted rewrite rules; and recognizing one or more of said speech sounds based on said one or more weighted finite-state transducers.

22. The method of claim 21 wherein the decision tree models comprise classification and regression trees.

23. The method of claim 22 wherein the decision tree models represent a phonetic realization of one or more phonemes by specifying a mapping of the phonemes into one or more allophones.

24. The method of claim 23 wherein one or more of the decision trees has been trained based on a linguistic database.

25. The method of claim 21 wherein the weighted rewrite rules comprise rules having a form $\phi \rightarrow \psi / \lambda\_\rho$, where $\phi$, $\lambda$, and $\rho$ represent regular expressions, $\psi$ represents a weighted regular expression, and where the form $\phi \rightarrow \psi / \lambda\_\rho$ represents that an occurrence of $\phi$ in an input string is to be replaced by $\psi$ whenever the occurrence of $\phi$ is preceded by $\lambda$ and succeeded by $\rho$.

26. The method of claim 25 wherein the weighted regular expression represented by $\psi$ comprises a rational power series.

27. The method of claim 25 wherein the step of generating the weighted finite-state transducers comprises generating a weighted finite-state transducer for a corresponding weighted rewrite rule having the form $\phi \rightarrow \psi / \lambda\_\rho$ by generating a composition of a first transducer, a second transducer, a third transducer, a fourth transducer and a fifth transducer, wherein:

the first transducer introduces a marker ">" before every occurrence of $\rho$;

the second transducer introduces markers "$<_1$" and "$<_2$" before each occurrence of $\phi$ that is followed by a ">" marker;

the third transducer replaces $\phi$ with $\psi$ when $\phi$ is preceded by a "$<_1$" marker and succeeded by a ">" marker, and deletes each of the ">" markers;

the fourth transducer admits only those input strings in which occurrences of a "$<_1$" marker are preceded by $\lambda$, and deletes the "$_1<$" marker at each such occurrence; and the fifth transducer admits only those input strings in which occurrences of a "$<_2$" marker are not preceded by $\lambda$, and deletes the "$<_2$" marker at each such occurrence.

28. The method of claim 21 wherein a given one of the decision tree models represents an input symbol, S, the given decision tree model further comprising a root node and a plurality of branches labeled with corresponding regular expressions, and wherein the step of generating the weighted rewrite rules comprises:

selecting one of the terminal nodes of the given decision tree model;

determining a path from the root node of the given decision tree model to the selected terminal node thereof, the path comprising one or more of the branches of the given decision tree model;

intersecting one or more of the regular expressions which label the branches of the given decision tree model comprised in the determined path, generating a left context, LC, and a right context, RC, therefrom;

generating a weighted disjunction, D, of output symbols based on the selected terminal node; and generating a weighted rewrite rule having a form S→D/ LC__RC, representing that an occurrence of the input symbol, S, in an input string is to be replaced by the weighted disjunction, D, whenever the occurrence of S is preceded by the left context, LC, and succeeded by the right context, RC.

29. The method of claim 21 wherein a given one of the decision tree models comprises a plurality of terminal nodes, wherein the step of generating the weighted rewrite rules comprises generating a plurality of weighted rewrite rules corresponding to the plurality of terminal nodes of the given decision tree model, and wherein the step of generating the weighted finite-state transducers comprises:

generating a plurality of weighted finite-state transducers corresponding to the plurality of generated weighted rewrite rules; and intersecting the plurality of weighted finite-state transducers to produce a weighted finite-state transducer corresponding to the given decision tree model.

30. The method of claim 29 wherein the step of generating the weighted finite-state transducers further comprises intersecting the weighted finite-state transducer corresponding to the given decision tree model with one or more other weighted finite-state transducers corresponding to one or more other decision tree models to produce a weighted finite-state transducer corresponding to a plurality of decision tree models.

\* \* \* \* \*

UNITED STATES PATENT AND TRADEMARK OFFICE
CERTIFICATE OF CORRECTION

PATENT NO.  : 5,806,032
DATED       : September 8, 1998
INVENTOR(S) : Richard W. Sprout and Mehryar Mohri It is certified that error appears in the above-identified patent and that said Letters Patent is hereby corrected as shown below:

<u>Title page,</u>
Paragraph [75] please correct the following:
Change "Inventor" to -- Inventors --;
After "Richard William Sprout, Berkeley Heights, N.J.", insert
-- Mehryar Mohri, New York City, N.Y. --

Signed and Sealed this

Fourteenth Day of August, 2001

*Attest:*

NICHOLAS P. GODICI
*Attesting Officer*    *Acting Director of the United States Patent and Trademark Office*